(12) United States Patent
Foell et al.

(10) Patent No.: US 9,723,963 B2
(45) Date of Patent: Aug. 8, 2017

(54) POWER SUPPLY ARRANGEMENT FOR A SUCTION DEVICE AND SUCTION DEVICE

(71) Applicant: Alfred Kärcher GmbH & Co. KG, Winnenden (DE)

(72) Inventors: Martin Foell, Winnenden (DE); Josip Cancar, Stuttgart (DE)

(73) Assignee: Alfred Kärcher GmbH & Co. KG, Winnenden (DE)

( * ) Notice: Subject to any disclaimer, the term of this patent is extended or adjusted under 35 U.S.C. 154(b) by 266 days.

(21) Appl. No.: 14/708,651

(22) Filed: May 11, 2015

(65) Prior Publication Data

US 2015/0238059 A1    Aug. 27, 2015

Related U.S. Application Data

(63) Continuation of application No. PCT/EP2012/072525, filed on Nov. 13, 2012.

(51) Int. Cl.
*A47L 9/28* (2006.01)
*A47L 9/12* (2006.01)
(Continued)

(52) U.S. Cl.
CPC ............... *A47L 9/2868* (2013.01); *A47L 9/12* (2013.01); *A47L 9/1418* (2013.01); *A47L 9/20* (2013.01);
(Continued)

(58) Field of Classification Search
CPC . A47L 9/20; A47L 9/2868; A47L 9/12; A47L 9/1418; A47L 9/2884; H02J 3/005; H02M 7/44; Y10T 307/367
See application file for complete search history.

(56) References Cited

U.S. PATENT DOCUMENTS 3,651,707 A    3/1972  Rees
4,440,238 A    4/1984  Sauerwein et al.
(Continued)

FOREIGN PATENT DOCUMENTS

EP    1 017 149    9/2011
GB    2 059 853    4/1981
(Continued)

*Primary Examiner* — Robert Scruggs
(74) *Attorney, Agent, or Firm* — Womble Carlyle Sandridge & Rice LLP

(57) ABSTRACT

A power supply arrangement for a suction device is provided, which is optionally operable using direct current or alternating current, including a first connection connectible to a direct current source, a second connection connectible to an alternating current source, a third connection connectible to a consuming unit of the suction device, an electrically isolated converter connected on the input side to the first connection, and a switchover device connected to an output of the converter, the second connection and to the consuming unit, wherein the switchover device allows selection of whether the consuming unit is actively connected to the converter or the second connection for power supply, and wherein the switchover device has one or more components each with an electrical safety clearance that is at least 4 mm in respect of the creepage distance and the total of the creepage distances of the components is at least 8 mm.

17 Claims, 5 Drawing Sheets

(51) Int. Cl.
*A47L 9/14* (2006.01)
*A47L 9/20* (2006.01)
*H02J 3/00* (2006.01)
*H02M 7/44* (2006.01)

(52) U.S. Cl.
CPC ............ *A47L 9/2884* (2013.01); *H02J 3/005* (2013.01); *H02M 7/44* (2013.01); *Y10T 307/367* (2015.04)

(56) References Cited

U.S. PATENT DOCUMENTS

| | | | |
|---|---|---|---|
| 4,829,226 A | | 5/1989 | Nakamura et al. |
| 4,847,513 A | | 7/1989 | Katz et al. |
| 5,198,743 A | | 3/1993 | McClure et al. |
| 5,298,821 A | | 3/1994 | Michel |
| 2005/0040920 A1 | | 2/2005 | Takano et al. |
| 2013/0312792 A1 | * | 11/2013 | Hensel ..................... A47L 9/20 134/18 |

FOREIGN PATENT DOCUMENTS

| | | |
|---|---|---|
| JP | 09-331684 | 12/1997 |
| WO | WO 93/23974 | 11/1993 |

* cited by examiner

POWER SUPPLY ARRANGEMENT FOR A SUCTION DEVICE AND SUCTION DEVICE

CROSS-REFERENCE TO RELATED APPLICATIONS

This application is a continuation of international application number PCT/EP2012/072525 filed on Nov. 13, 2012, which is incorporated herein by reference in its entirety and for all purposes.

BACKGROUND OF THE INVENTION

The invention relates to a power supply arrangement for a suction device which is optionally operable using direct current or alternating current, in particular mains current.

EP 1 017 149 B1 discloses a system with/without a cable for electrical tools, including a low-voltage direct current electrical tool which can be operated in a preselected voltage range, wherein the electrical tool includes an electrical system for operation of the tool, and a pre-defined electrical interface for mechanical and electrical connection to a power supply module. A non-isolated converter power supply module with cable is provided, and this is of a mechanical and electrical construction such that it can be connected to an electrical current source of relatively high voltage and such that it is compatible with the low-voltage direct current electrical tool, wherein the non-isolated power supply module with cable is adapted to convert the electrical current of relatively high voltage from the electrical power source into a direct current voltage which is not galvanically isolated from the electrical power source of relatively high voltage and which is located within the preselected voltage range that is suitable for driving the low-voltage direct current electrical tool. The electrical tool includes a completely insulated housing that surrounds the electrical system in order to prevent an electrical charge from being conducted from the interior to the exterior of the electrical tool.

SUMMARY OF THE INVENTION

In accordance with the present invention, a power supply arrangement for a suction device is provided, which allows the suction device to be operated using primary direct current or primary alternating current and which has a high degree of electrical safety in the event of a fault.

In accordance with an embodiment of the invention, a first connection is provided to which a direct current source is connectible or connected, a second connection is provided to which an alternating current source is connectible or connected, at least one third connection is provided to which one or more consuming units of the suction device are connectible or connected, an electrically isolated converter is provided which is connected on the input side in electrically active manner to the first connection, and a switchover device is provided which is connected in electrically active manner to an output of the converter, is connected to the second connection and is connected to the at least one consuming unit, wherein by means of the switchover device it is selectable whether the at least one consuming unit is actively connected to the converter or the second connection for power supply, and wherein the switchover device has one or more components each with an electrical safety clearance, and the safety clearance of such a component is at least 4 mm in respect of the creepage distance and the total of the creepage distances of the components is at least 8 mm.

As a result of the power supply arrangement according to the invention, the suction device can optionally be operated from a direct current source such as in particular a battery unit or from an alternating current source and in particular mains current. During operation with the direct current source, the converter provides a direct current or alternating current. In particular, the converter steps up the voltage.

The electrically isolated converter ensures that in the event of a fault an alternating current that is provided by the alternating current source cannot break through to the first connection and in particular to battery contacts.

The switchover device, which in particular includes one or more relays, contactors or switches, ensures that, during operation using the direct current source, if there is a malfunction the converted direct current voltage cannot break through to the second connection. The electrical safety clearance prevents a corresponding discharge.

The switchover device has a total creepage distance of at least 8 mm, wherein those components ensuring the safety clearance and each having a creepage distance, have a safety clearance in respect of the creepage distance of at least 4 mm. This can be realized in a variety of ways. For example, there is only one component having a creepage distance. In that case this creepage distance must be at least 8 mm. It is also possible for example for there to be (at least) two components which each have a creepage distance of at least 4 mm. The one component then provides a base level of insulation and the other component provides additional insulation. The total creepage distance in respect of the two components is then at least 8 mm.

The creepage distance is defined as the shortest distance along the surface of an insulating material between two conductive parts. In particular in respect of components of the switchover device, the creepage distance is the shortest distance along the surface of an insulating material between connection contacts.

The power supply arrangement according to the invention can be realized using a relatively small number of components. A high degree of electrical safety can be achieved.

It is further possible to achieve a high degree of electrical protection if the safety clearance in respect of the air gap of a component is at least 2 mm and the total of the air gaps of the components is at least 4 mm. The air gap is defined as the shortest distance in the air between two conductive parts. In particular in the switchover device, in respect of a respective component the air gap is related to switching contacts. The air gap between contacts may be smaller than the creepage distance since it is the surface contour which is relevant in the case of the creepage distance.

The air gap of at least 4 mm may, once again, be realized in a variety of ways. For example, there is only a single component that is relevant to the safety clearance, which has an individual air gap of at least 4 mm. It is also possible for there to be (at least) two components which each have an individual air gap of at least 2 mm. This once again gives a total air gap of at least 4 mm.

It is favorable if, where there is a plurality of components, at least two components are connected in series in relation to the second connection, This provides an effective way to prevent a break through to the second connection, with the safety clearances of the components being added together.

In one embodiment, the switchover device has at least one component, such as a relay, which allows switching to and from a state in which the third connection is in connection in a manner effective for power supply either with the second connection or with the output of the converter. The switchover device, which is in particular triggered by a control device, then switches to determine which primary current source supplies the consuming unit.

In particular, the switchover device includes at least one relay and/or a contactor and/or a switch. The safety clearance to the switchover device can then be realized in a simple manner by providing a corresponding creepage distance and a corresponding air gap.

In one embodiment, the switchover device has at least one (first) component as the electrical base insulation and at least one further component as an additional electrical insulation. As a result, a high degree of electrical insulation for fault events can be realized in a simple manner using a small number of components.

In an embodiment of a simple construction, the at least one further component has a switch-through function with no switchover function. It can thus take the form of a "simple" switch.

It is favorable if contacts of the switchover device which are required for a switching function are arranged on a support, in particular a circuit board, and a creepage distance (contact spacing) is formed between the contacts by one or more recesses between the contacts and in particular by one or more recesses passing right through the support. As a result, a contact spacing that determines the safety clearance may be realized in a simple manner.

In particular, a dimension of the at least one recess that is crucial for a creepage distance in respect of a spacing between spaced contacts (which are effective for the switching function) is at least 4 mm. As a result, the safety clearance of the switchover device can be realized in a simple manner.

The electrically isolated converter isolates an alternating current voltage side having the alternating current source from the direct current source. If one or more consuming units of the suction device are operated with alternating current voltage from the alternating current source, then in the event of a fault breakdown to contacts of the direct current source is prevented.

Favorably, the switchover device isolates a direct current voltage side having the direct current source from the alternating current source by means of the safety clearance. If the consuming unit or consuming units of the suction device are operated primarily by way of the direct current source, then in the event of a fault the corresponding switchover device prevents breakdown of the converted direct current voltage to the second connection.

In one embodiment, the converter provides a direct current voltage or alternating current voltage of 100 V or more, and in particular provides a direct current voltage or alternating current voltage of 140 V or more for a cleaning procedure on the suction device.

This allows filter cleaning of the suction device to be performed even during primary operation with the direct current source.

In particular, the direct current source is a rechargeable battery unit having one or more cells.

The invention further relates to a suction device, in particular a vacuum cleaner, including a suction inlet, a dirt collection container, a filter device, a suction removal line and a suction assembly, wherein the dirt collection device is in flow connection with the suction assembly by way of the filter device and the suction removal line, and negative pressure from the suction assembly acts on the filter device.

According to the invention, the suction device has a power supply arrangement according to the invention.

In particular, a cleaning device for the filter device is provided, and this cleaning device makes it possible to clean the filter device, preferably automatically.

It is favorable if a consuming unit of the suction device is an electric motor device of the suction assembly and/or a cleaning device for the filter device. It is also possible to provide further components of the suction device with electrical power by way of the power supply arrangement.

It may be provided for one or more power consuming units of the suction device to be operable alternatively by direct current or alternating current. For example, the suction assembly of the suction device includes as the electric motor a universal motor which is operable both with direct current and with alternating current. As a result, there may be used as the electrically isolated converter a converter that provides a stepped-up direct current.

The description below serves in conjunction with the drawings to explain the invention in more detail.

DETAILED DESCRIPTION OF THE INVENTION

Figure 1:
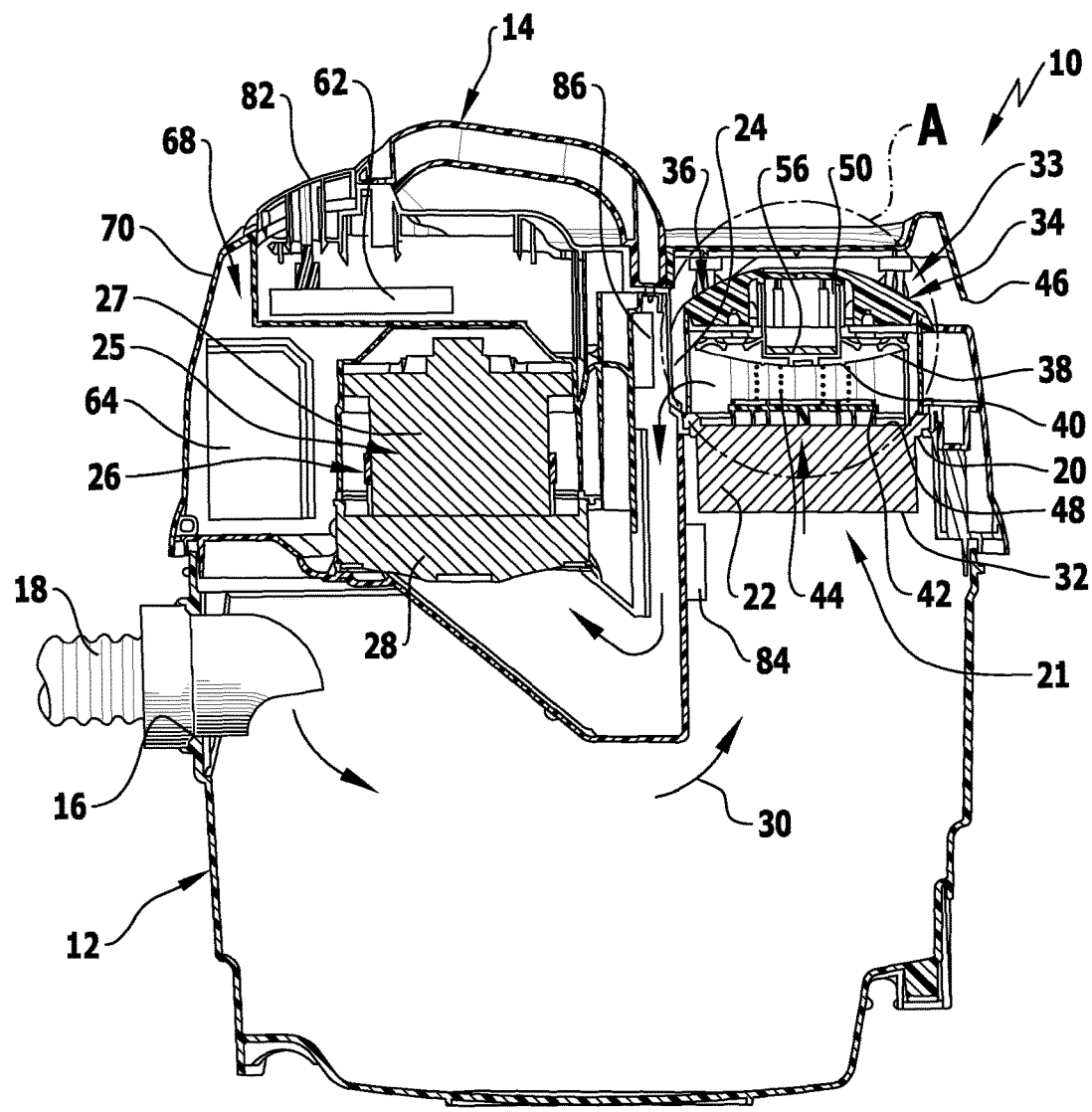
FIG. 1 shows a schematic sectional view of an exemplary embodiment of a vacuum cleaner.
Figure 3:
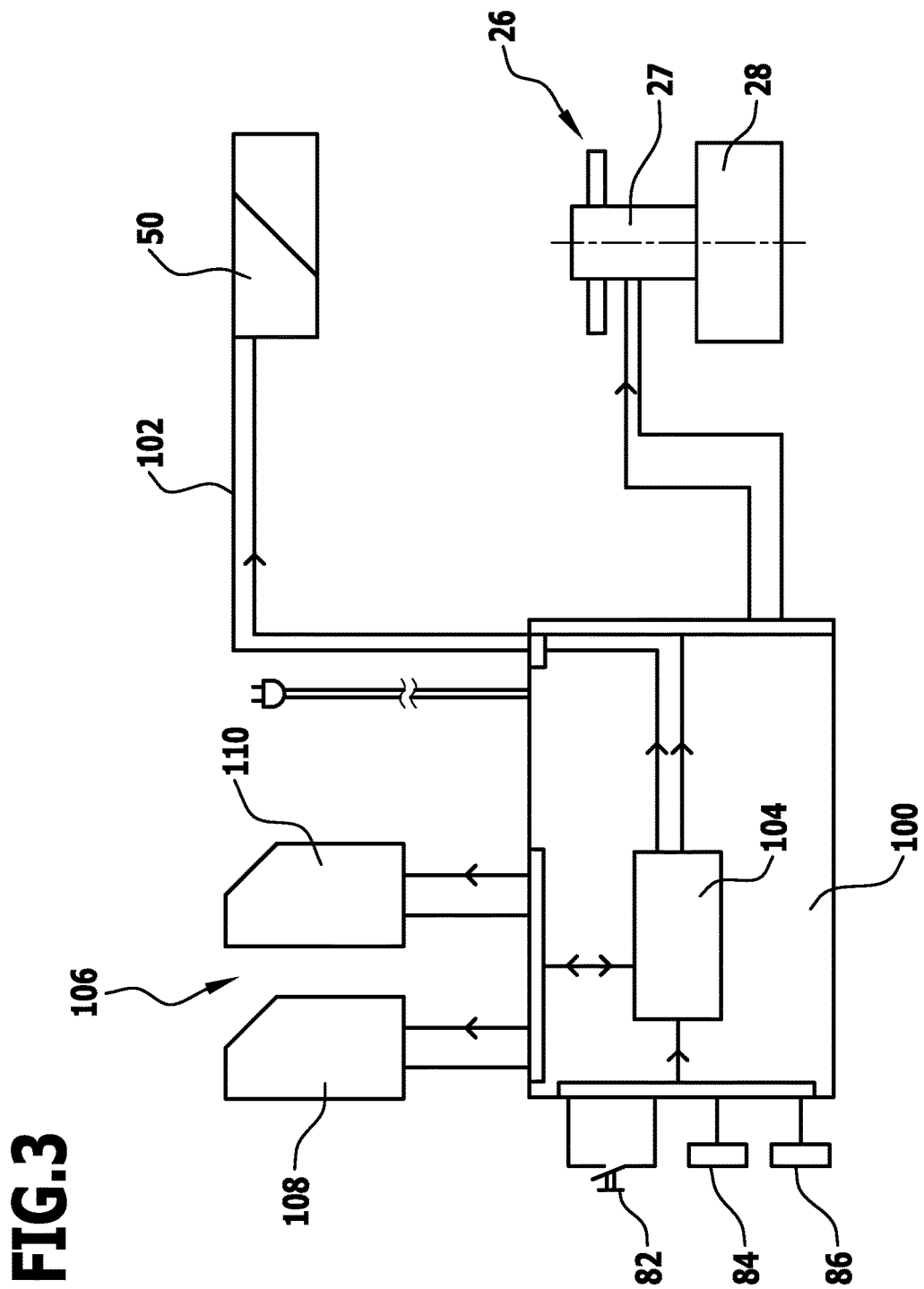
FIG. 3 shows a block diagram of a control device of the vacuum cleaner according to FIG. 1.
Figure 4:
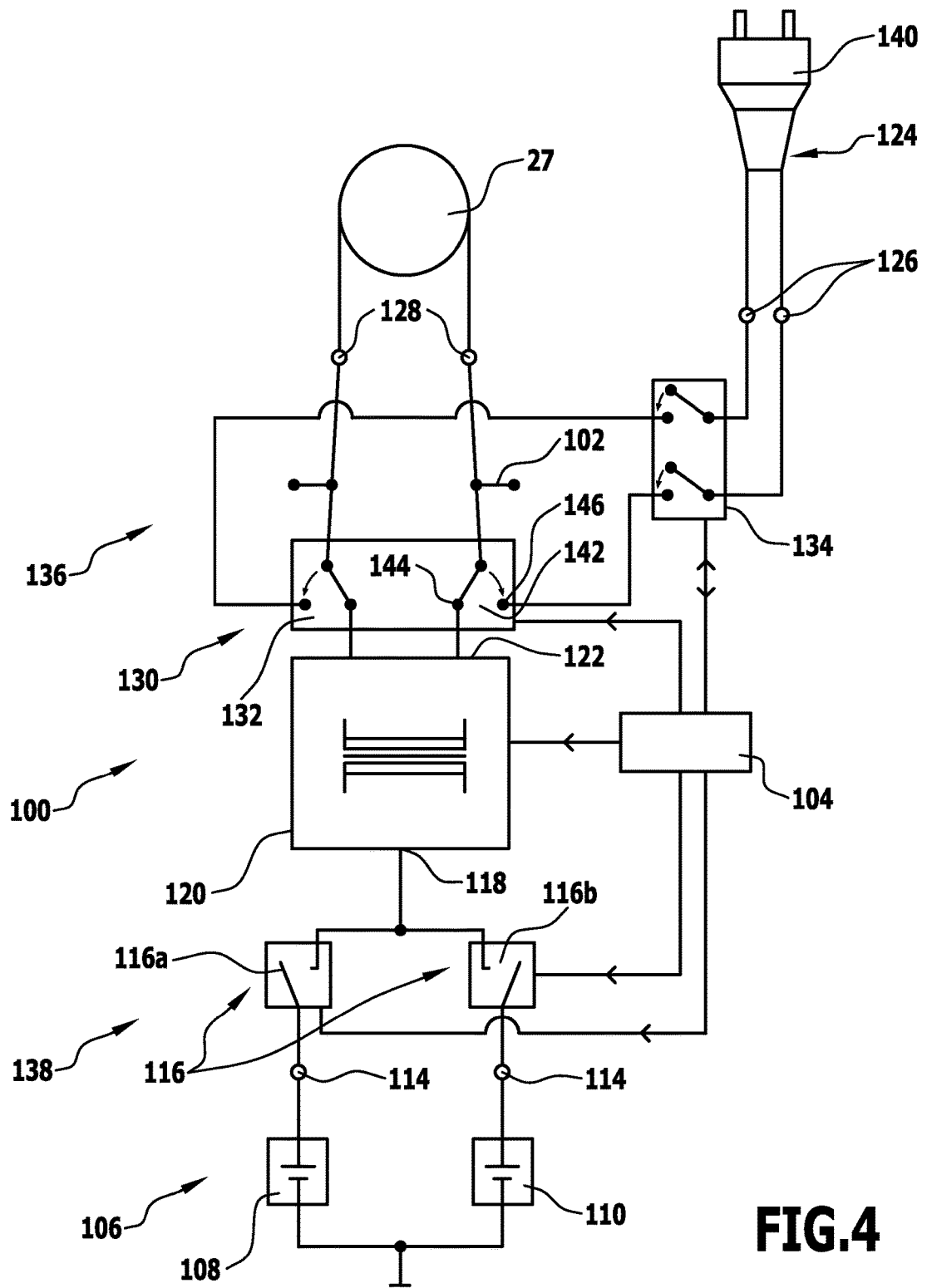
FIG. 4 shows a schematic block diagram illustration of a power supply arrangement of the vacuum cleaner according to FIG. 1.
Figure 5:
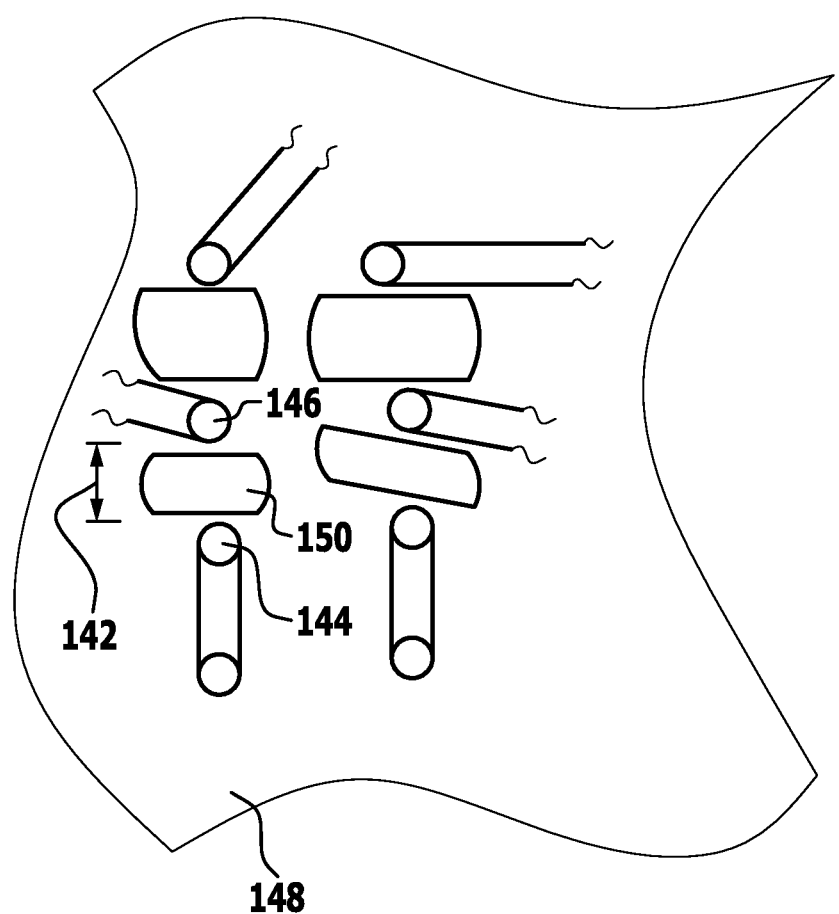
FIG. 5 shows a detail of a support on which at least part of the power supply arrangement according to FIG. 4 is arranged.

An exemplary embodiment of a vacuum cleaner 10 serving as a suction device, illustrated schematically in a sectional view in FIG. 1, has a dirt collection container 12 on which there is set a suction head 14. The dirt collection container 12 has a suction inlet 16 to which a suction hose 18 can be connected in conventional manner The suction head 14 seals the dirt collection container 14 at the upper side and forms a suction outlet 20 at which a filter device 21 having a (at least one) filter 22 is held. Adjoining the filter 22 is a suction outlet line 24 by way of which the dirt collection container 12 is in flow connection with a suction assembly 26. The suction assembly 26 includes an electric motor device 25 having an (at least one) electric motor 27 and a fan 28 that is driven in rotation by the electric motor 27. The electric motor device 25 is supplied with electrical power by way of a power supply arrangement 100 (FIGS. 3, 4).

The suction assembly 26 applies negative pressure to the dirt collection container 12 during operation of the vacuum cleaner 10, creating a suction flow, illustrated in FIG. 1 by the arrows 30. Due to the action of the suction flow 30, suction air laden with dirt can be drawn by suction into the dirt collection container 12 by way of the suction inlet 16 and can then be removed by suction by the suction assembly 26. The suction air can be emitted to the surroundings by the suction assembly 26 by way of exhaust air openings in the suction head 14 which are not illustrated in the drawing and are known per se to those skilled in the art.

The suction air flows through the filter 22 such that entrained solid particles are deposited on the dirty side 32 of the filter 22, that is the side facing the dirt collection container 12. It is thus necessary to clean the filter 22 from time to time, since otherwise an increasing resistance to flow is created, as a result of which the suction action of the vacuum cleaner 10 is impaired.

Figure 2:
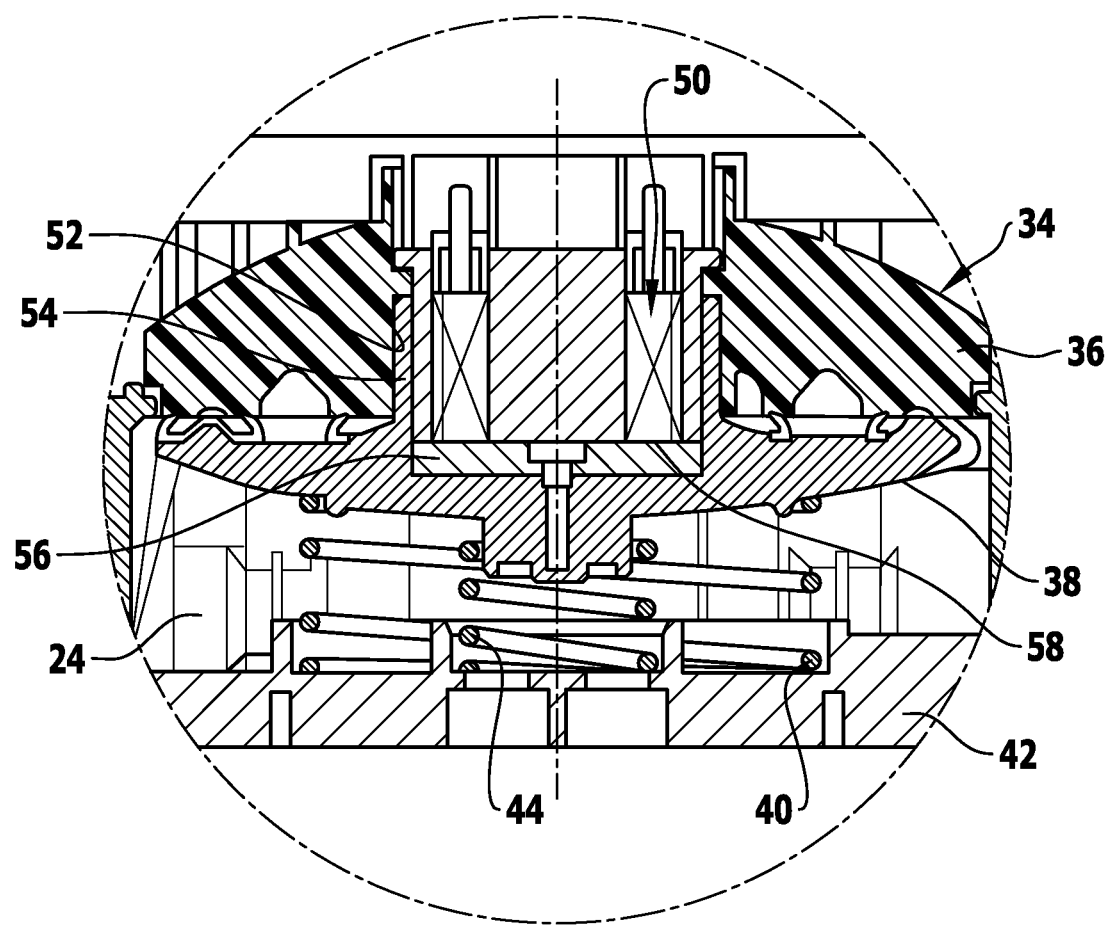
FIG. 2 shows an enlarged illustration of an external air valve device of the vacuum cleaner according to FIG. 1.

For cleaning the filter 22, an external air valve device 33 having an (at least one) external air valve 34 is arranged in the suction head 14 above the filter 22 (illustrated on a larger scale in FIG. 2). It includes a valve mounting 36 that is arranged stationary in the suction head 14 and forms a valve seating for a movable valve body in the form of a valve disc 38. The valve disc 38 is urged by a closing force in the direction of the valve mounting 36 by means of a closing spring 40. The closing spring 40 is clamped between a plate-like filter mounting 42, which is arranged stationary in the suction head 14 and has a multiplicity of flow apertures, and the valve disc 38. In addition to the closing spring 40, the filter mounting 42 carries a resilient abutment element in the form of an abutment spring 44. The latter has in particular (and preferably similarly to the closing spring 40) a linear characteristic. For example, it takes the form of a helical spring. In contrast to the closing spring 40, the abutment spring 44 has no bias towards the closed position of the valve disc 38. Only when the valve disc 38 is moved away from the valve seating of the valve mounting 36 does the abutment spring 44 come into abutment against the underside of the valve disc 38 and, when the valve disc 38 undergoes further movement, is it compressed somewhat. As a result, it exerts an increasing restoring force on the valve disc 38 and accelerates the movement of the valve disc 38 from its closed valve position (illustrated in FIG. 2) through an opened valve position and back into the closed valve position. In the opened valve position, the valve disc 38 adopts a spacing from the valve mounting 36 forming the valve seating.

The valve mounting 36 has a multiplicity of passage apertures (not illustrated in the drawing) whereof the mouth regions are closed by the valve disc 38 when the latter adopts its closed valve position. At the level of the valve mounting 36, the suction head 14 has a lateral aperture 46. External air can flow into the passage apertures in the valve mounting 36 through the lateral aperture 46. When the valve disc 36 adopts its open valve position, spaced from the valve mounting 36, then the lateral aperture 46 is in flow connection with the suction outlet line 24 by way of the passage apertures in the valve mounting 36 and external air can act on the clean side 48 of the filter 22, that is to say the side remote from the dirt collection container 12. When the valve disc 38 adopts its closed valve position, the flow connection between the lateral aperture 46 and the suction outlet line 24 is interrupted.

In a central region, the valve mounting 36 carries an electromagnet 50. In the peripheral direction, the electromagnet 50 is surrounded by an annular space 52 into which there penetrates a guide sleeve 54 that is integrally formed on the upper side of the valve disc 38. The guide sleeve 54 receives a magnetizable element that is for example in the form of an iron plate 56 which, in the closed valve position of the valve disc 38, abuts against a free end edge 58 of the electromagnet 50 and, in combination with the electromagnet 50, forms a closed magnetic circuit.

The electromagnet 50 is in electrical connection by way of a power supply line 102 (FIG. 3) with a power supply arrangement 100 arranged in the suction head 14. A supply current from the power supply arrangement 100 acts on the electromagnet 50 during normal suction operation of the vacuum cleaner 10. For control there is provided an electrical control device 104. Because of the magnetic field that is created, the valve disc 38 is held reliably in its closed position. The holding force of the electromagnet 50 is supported by the spring force of the closing spring 40.

FIG. 3 indicates power supply lines (with no arrow) and signal lines (with arrow).

If the power supply to the electromagnet 50 is interrupted by the control device 104, there is no magnetic holding force acting on the valve disc 38, and because of the pressure difference acting on it, which is produced by the external pressure of the external air in the region of the valve mounting 36, and the internal pressure within the suction outlet line 24, the valve disc 38 is moved away from the valve seating in opposition to the action of the closing spring 40. External air can then suddenly flow through the passage apertures in the valve mounting 36 and into the suction outlet line 24, and external air acts suddenly on the filter 22, on its clean side 48. This results in mechanical jolting of the filter 22. Moreover, external air flows through the filter 22 in the direction of counter-current, that is to say in opposition to the flow direction 30 that prevails during normal suction operation. The consequence is that the filter 22 is effectively cleaned.

The vacuum cleaner 10 is supplied with power with the aid of the power supply arrangement 100. The latter includes a direct current source 106 having for example two rechargeable batteries 108, 110. The batteries 108, 110 are for example lithium ion cells. In an embodiment, these are arranged laterally next to the suction assembly 26 in a battery compartment 68 in the suction head 14. The battery compartment 68 is accessible to the user by way of an outwardly pivotal flap 70, for replacing the batteries 108, 110.

In one embodiment, the power supply arrangement 100 and the electronic control device 104 are arranged above the suction assembly 26 in the suction head 14. On the input side, a button 82 which is manually actuable by the user is connected to the control device 102 and is arranged on the upper side of the suction head 14. By actuating the button 82, the user can for example (manually) trigger or switch off or on a filter-cleaning procedure, depending on the function assigned to the button 82.

The battery device may also include a ventilation device for cooling the batteries 108, 110 (not shown in the drawing). Where cells that require cooling are used as the batteries, then a battery-conserving operation can be realized. The ventilation device for its part receives its electrical power for operation preferably from the batteries 108, 110 when there is battery operation.

In one embodiment, the electronic control device 104 is arranged on a circuit board. Moreover, a receptacle for the direct current source 106 is arranged on the circuit board. The receptacle in particular receives the batteries 108, 110. It is also possible for a ventilation device of the direct current source 106 to be arranged on the receptacle.

The control device 104 also includes electronics for open-loop control and/or closed-loop control and/or monitoring of the direct current source 106. For example, the control device 104 by means of which the electric motor device 25 is triggered may be used to control the ventilation device such that the latter is operated in accordance with triggering of the electric motor device 25. For example, when the electric motor 27 that is triggered by the control device 62 is switched off, the ventilation device is also switched off (where appropriate with a delay). For example, it is also possible to switch off the ventilation device when a procedure of cleaning the filter is performed.

Further, in this case the control device 104 may be used to perform a control that enables the direct current source 106 to be operated carefully and in a manner optimized to maximize the battery capacity. For example, in this case the control device 104 may also be used to appropriately control or monitor a procedure of charging the batteries 108, 110 by way of a charging unit (not shown in the drawing). Further, the control device 104 may be used to monitor the "ageing" of the batteries 108, 110.

As an alternative or in addition, it may be provided for a first pressure sensor 84 to be arranged upstream of the filter 22 and a second pressure sensor 86 to be arranged downstream of the filter 22, these pressure sensors being connected to the control device 104 in a manner transmitting signals, and each providing a pressure-dependent control signal. By means of the two pressure sensors 84 and 86 the pressure difference established at the filter 22 can be determined. The more solid particles there are deposited on the filter 22, the greater the flow resistance of the filter 22 and the greater also the pressure difference that is established. If the pressure difference reaches a predeterminable value, the control device 62 can trigger a procedure for cleaning the filter independently (automatically).

As an alternative or in addition, it may be provided for the control device 104 to trigger a procedure for cleaning the filter independently (automatically), regardless of the prevailing pressure conditions and regardless of the possible actuation of the button 82, at constant or varying intervals in time.

As already mentioned, cleaning the filter is performed in that the supply of current to the electromagnet 50 is briefly interrupted by the control device 104.

An exemplary embodiment of a temporal sequence of the supply current provided by the control device 104 to the electromagnet 50 is described in PCT/EP2011/052039, dated 11 Feb. 2011, to the full content of which reference is expressly made: at a point in time $t_2$ (see FIG. 4 in PCT/EP2011/052039) the supply of current to the electromagnet 50 is interrupted, with the result that the external air valve 34 moves from its closed valve position to its opened valve position, and at a subsequent point in time $t_3$ the supply of current to the electromagnet 50 is provided again, with the result that the external air valve 34 adopts its closed valve position again. In the exemplary embodiment illustrated, the supply of current is interrupted three times in quick succession, with the result that external air acts suddenly and three times in succession on the clean side 48 of the filter 22 and to a large extent flows through the filter 22 in the direction of counter-current. This detaches solid particles adhering to the dirty side 32. At the end of the third interruption in current, that is to say at a point in time $t_E$, the cleaning procedure is at an end.

In an exemplary embodiment of this kind, a complete cleaning procedure thus includes three opening and closing movements of the external air valve in quick succession. The length of the time interval between the points in time $t_2$ and $t_3$ may for example be 90 milliseconds. After a cleaning procedure, normal suction operation is re-established, in which the control device 62 provides supply current to the electromagnet 50 and the external air valve 34 maintains its closed valve position. During normal suction operation, the suction power of the suction assembly 26 is kept constant. During the time-controlled cleaning procedure of the filter, after a suction operation of for example 15 seconds a cleaning procedure with a three-time sudden supply of external air once again takes place, as explained above. The length of the time interval between two cleaning procedures is preferably establishable manually. As an alternative or in addition, a cleaning procedure may be triggered manually by means of the button 82 and/or in sensor-controlled manner by means of the pressure sensors 84, 86.

The control device 104 controls the operating sequences of the vacuum cleaner 10. It also controls, at least by means of a sub-unit, the power supply arrangement 100. The control device 104 may be part of the power supply arrangement 100 or separate therefrom.

An exemplary embodiment of a power supply arrangement 100 according to the invention, which is shown schematically in a block diagram illustration in FIG. 4, includes a first connection 114 to which the direct current source 106 is connectible or connected (in particular using the batteries 108, 110). Here, the connection of the direct current source 106 to the first connection 114 may be fixed or detachable.

A switching device 116 is associated with the first connection 114. This switching device is in connection with the input of an electrically isolated converter 120. The converter 120 raises the voltage; it is a step-up converter. It includes in particular one or more transformers and corresponding electronic components. It is in particular subject to the standard EN 61558.

The switching device 116 is triggered by the control device 104. If the switching device 116 is in a closed switch position, the direct current voltage supplied by the direct current source 106 is applied across the input 118 of the converter 120. If the switching device 116 is in an open switch position, the potential at the input 118 is zero. The switch position of the switching device 116 is established by way of the control device 104.

In an exemplary embodiment in which the direct current source 106 includes a plurality of batteries 108, 110, the switching device 116 has switches 116a, 116b etc. associated with the respective batteries. This forms switching lines each having a switch 116a, 116b etc. and the associated battery 108, 110, wherein each switching line is in particular switchable individually.

The electrically isolated converter 120 has an output 122. In an exemplary embodiment, the converter 120 converts the direct current voltage that is provided by the direct current source 106 into a (usable) direct current voltage that may be picked up at the output 122.

It is in principle also possible for a correspondingly formed converter 120 to provide a (usable) alternating current voltage.

As an alternative to operation with the direct current source 106, the vacuum cleaner 10 is also operable by way of a primary alternating current source 124. It is in particular operable by way of mains current. For this purpose, the power supply arrangement 100 has a second connection 126. The alternating current source 124 is connectible or connected to this second connection.

In an embodiment, the electric motor 27 is a universal motor. It is then operable alternatively using direct current or alternating current.

The power supply arrangement 100 further has a (at least one) third connection 128 to which one or more consuming units of the vacuum cleaner 10 are connectible or connected. In FIG. 4, the electric motor 27 is connected to the third connection 128.

By means of the third connection 128 (or by means of a further consuming unit connection) the electromagnet 50 is also connected by way of the power supply line 102.

The power supply arrangement 100 has a switchover device, designated 130 as a whole. This switchover device 130 makes it possible to establish whether the consuming unit or consuming units of the vacuum cleaner 10, such as in particular the electric motor 27, are supplied by way of alternating current, which is provided by the alternating current source 124, or by way of direct current, which is provided by the direct current source 106 and has been converted (stepped up) by the converter 120.

The switchover device 130 has contacts which are electrically connected or electrically isolated, depending on the switch position. In particular, there is provided a switch position in which alternating current from the alternating current source 124 supplies the consuming unit or consuming units and the consuming unit is uncoupled from the output 122 of the converter 120, and has a further switch position in which the at least one consuming unit is supplied by way of alternating current voltage applied across the output 122 of the converter 120 and the alternating current source 124 is uncoupled from the at least one consuming unit.

In FIG. 4, the latter switch position is shown, in which, after conversion at the converter 120, the direct current source 106 provides the alternating current required for operation of the consuming unit 27.

In principle, the switchover device may be triggered by the control device 104. For example, whether the alternating current source 124 is connected—such as the presence of a mains connection—is detected. In this case, the control device 104 can then ensure that the switchover device 130 is set to the switch setting in which the alternating current source 124 provides the consuming unit current.

In principle, a manual setting to operation using the alternating current source 124 or the direct current source 106 is also possible, wherein the switchover device 130 then receives the corresponding control signals from the control device 104.

In an exemplary embodiment, the switchover device 130 is formed in a plurality of parts. It includes a first component 132, in particular in the form of a relay or contactor which is in direct connection with the output 122 of the converter 120. The first component 132 is connected to the third connection 128 by way of a second component 134. In an exemplary embodiment, the first component 132 has a switchover function. The second component 134 has a switch-through function, with no switchover function. As regards the second connection 126, the first component 132 and the second component 134 are connected in series.

In a first switch position of the second component 134, the flow of current to the first component 132 is interrupted from the alternating current source 124. In a second switch position, this flow of current is made possible. FIG. 4 shows the first switch position.

The first component 132 has a first switch position in which power is supplied to the consuming unit 27 by way of converted direct current voltage from the direct current source 106. In a second switch position, the power is supplied by way of the alternating current source 124. FIG. 4 shows the first switch position. In this exemplary embodiment, the first component 132 provides an electrical base insulation—as will be explained in more detail below. The second component 134 provides an additional electrical insulation.

In a concrete exemplary embodiment, the alternating current source 124 is mains current of 230 V. The direct current source 106 provides a direct current voltage of 36 V at the input 118.

The converter 120 converts to a voltage of at least 100 V (direct current voltage) and in particular at least 140 V (direct current voltage). In particular, a step-up conversion to approximately 160 V direct current voltage is provided. The electrical power available at the output 122 is approximately 800 W.

Consequently, the converter 120 is a step-up converter which is electrically isolated (galvanically isolated). As a result, and as will be explained in more detail below, the possibility that alternating voltage from the alternating current source 124 will be applied to the first connection 114 is prevented.

In operation using the alternating current source 124, the power consumption of the electric motor 27 in a concrete exemplary embodiment is approximately 1200 W and in direct current voltage operation using the direct current source 106 it is approximately 800 W.

A procedure of cleaning the filter can also be performed in direct current voltage operation, that is to say that a device for cleaning the filter with the electromagnet 50 can be supplied with power accordingly in order to achieve a corresponding negative pressure for cleaning and to trigger the electromagnet 50.

In principle, in the event of a fault during operation using the alternating current source 124 (in particular in mains operation), the corresponding voltage may be applied to contacts of the batteries 108, 110, that is to say to the first connection 114 and the input 118. According to the invention, it is provided for the converter 120 to be electrically isolated (galvanically isolated). This specifically prevents this application of alternating current voltage from the alternating current source 124, that is to say breakdown from an alternating current voltage side 136 to a direct current voltage side 138 is prevented.

In direct current operation, during which the direct current source 106 (in particular by way of the batteries 108, 110) provides the electrical power for the consuming unit or consuming units of the vacuum cleaner 10, the voltage applied to the output 122 of the converter 120 must not be applied to the third connection 128 (and in particular the mains plug 140). This is achieved by an appropriate formation of the switchover device 130. The switchover device 130 has a safety clearance in respect of contacts of a total of at least 8 mm. The safety clearance is realized by way of a creepage distance (contact spacing) 142 and an air gap between corresponding electrical parts (electrical contacts) of the components 132, 134 of the switchover device 130. This contact spacing 142 between associated contacts 144, 146 on a component 132 or 134 is at least 4 mm.

The total safety clearance of the switchover device 130 of at least 8 mm is realized in the exemplary embodiment shown in that the first component 132 has a creepage distance of at least 4 mm and the second component also has a creepage distance of at least 4 mm.

In an alternative embodiment, there is provided only a single component of the switchover device (which then also has switchover functions), which has a creepage distance of at least 8 mm.

Further, the switchover device 130 has a safety clearance of at least 4 mm in respect of the air gap. Individual components 132, 134 having an air gap in this case have an air gap of at least 2 mm. In the exemplary embodiment shown, having the first component 132 and the second component 134, these each have an air gap of at least 2 mm.

In an alternative embodiment, in which the switchover device 130 has only one component that is of relevance to the safety clearance, such as a relay, the air gap at this component must be at least 4 mm. (As a result the total of all air gaps is also at least 4 mm.)

In an exemplary embodiment, a support 148 is in particular provided in the font of a circuit board on which at least some of the components of the power supply arrangement 100 are arranged. This support 148 can in this case also receive the electronic circuit device 102 as described above.

Between corresponding contacts 144, 146 on the support 148 there is formed a recess 150. The recess 150 in particular passes right through. It is in the form of a slot and is made for example by milling a hole out of the support 148. This milled-out hole ensures that there is a contact spacing (creepage distance) of at least 4 mm between connection contacts.

Further, an air gap of at least 2 mm is provided as the spacing between switch contacts.

A corresponding safety clearance of 4 mm (at least) in the creepage distance is also provided at the second component 134. As a result, the first component 132 forms the electrical base isolation and the second component 134 forms an additional electrical isolation.

In this way, in the event of a fault, an application of the stepped-up direct current voltage of the direct current source 106 to the mains plug 140 or second contact 26 is prevented effectively.

Overall, the safety clearance of the switchover device 130 in respect of the total of the creepage distances is at least 8 mm as a result of the corresponding formation of the components 132, 134 of the switchover device 130 that have relevance for the safety clearance. Here, it is always provided for each contact region of the switchover device 130 at which switching for uncoupling the second connection 126 from a consuming unit is performed to have the appropriate safety clearance of at least 4 mm.

The safety clearance of the switchover device 130 in respect of the total of the air gaps is at least 4 mm as a result of the corresponding formation of the components 132, 134 of the switchover device 130 that have relevance for the safety clearance. Here, it is always provided for each contact region of the switchover device 130 at which switching for uncoupling the second connection 126 from a consuming unit is performed to have the appropriate safety clearance in respect of the air gap of at least 2 mm.

As a result of the power supply arrangement 100, which is in particular integrated into a suction device or vacuum cleaner 10, there is obtained simply and effectively, both for battery operation by way of the direct current source 106 and for mains operation, effective prevention of the application of a "wrong" voltage; the possibility that during mains operation the alternating current voltage of the alternating current source 124 may be applied to battery contacts is prevented, and the possibility that during direct current operation the transformed voltage of the direct current source 106 may be applied to the third connection 128 and in particular the mains plug 140 is prevented.

LIST OF REFERENCE NUMERALS

10 Vacuum cleaner
12 Dirt collection container
14 Suction head
16 Suction inlet
18 Suction hose
20 Suction outlet
21 Filter device
22 Filter
24 Suction outlet line
25 Electric motor device
26 Suction assembly
27 Electric motor
28 Fan
30 Suction flow
32 Dirty side
33 External air valve device
34 External air valve
36 Valve mounting
38 Valve disc
40 Closing spring
42 Filter mounting
44 Abutment spring
46 Lateral aperture
48 Clean side
50 Electromagnet
52 Annular space
54 Guide sleeve
56 Iron plate
58 End edge
68 Battery compartment
70 Flap
82 Button
84 First pressure sensor
86 Second pressure sensor
100 Power supply arrangement
102 Power supply line
104 Control device
106 Direct current source
108 Battery
110 Battery
114 First connection
116 Switching device
116a Switch
116b Switch
118 Input
120 Converter
122 Output
124 Alternating current source
126 Second connection
128 Third connection
130 Switchover device
132 First component
134 Second component
136 Alternating current voltage side
138 Direct current voltage side
140 Mains plug
142 Creepage distance
144 Contact
146 Contact
148 Support
150 Recess

The invention claimed is:

1. A power supply arrangement for a suction device which is selectively operable using direct current or alternating current, in particular mains current, including:
 a first connection to which a direct current source is connectible or connected;
 a second connection to which an alternating current source is connectible or connected;
 at least one third connection to which one or more consuming units of the suction device are connectible or connected;
 an electrically isolated converter which is connected on the input side in electrically active manner to the first connection; and
 a switchover device which is connected in electrically active manner to an output of the converter, is connected to the second connection and is connected to the at least one consuming unit;

wherein by means of the switchover device it is selectable whether the at least one consuming unit is actively connected to the converter or the second connection for power supply; and wherein the switchover device has one or more components each with an electrical safety clearance, and the safety clearance of such a component is at least 4 mm in respect of the creepage distance and the total of the creepage distances of the components is at least 8 mm.

2. The power supply arrangement according to claim 1, wherein the safety clearance in respect of the air gap of a component is at least 2 mm and the total of the air gaps of the components is at least 4 mm.

3. The power supply arrangement according to claim 1, wherein, where there is a plurality of components, at least two components are connected in series in relation to the second connection.

4. The power supply arrangement according to claim 1, wherein the switchover device has at least one component by means of which it is selectable whether the third connection is in connection in a manner effective for power supply either with the second connection or with the output of the converter.

5. The power supply arrangement according to claim 1, wherein the switchover device includes at least one of (i) at least one relay, (ii) a contactor and (iii) a switch.

6. The power supply arrangement according to claim 1, wherein the switchover device has at least one component as the electrical base insulation and at least one further component as an additional electrical insulation.

7. The power supply arrangement according to claim 6, wherein the at least one further component has a switch-through function with no switchover function.

8. The power supply arrangement according to claim 1, wherein contacts of the switchover device are arranged on a support, in particular a circuit board, and a creepage distance is formed between the contacts by one or more recesses between the contacts and in particular by one or more recesses passing right through the support.

9. The power supply arrangement according to claim 8, wherein a dimension of the at least one recess that is determinative for a creepage distance in respect of a spacing between spaced contacts is at least 4 mm.

10. The power supply arrangement according to claim 1, wherein the electrically isolated converter isolates an alternating current voltage side having the alternating current source from the direct current source.

11. The power supply arrangement according to claim 1, wherein the switchover device isolates a direct current voltage side having the direct current source from the alternating current source by means of the safety clearance.

12. The power supply arrangement according to claim 1, wherein the converter provides a direct current voltage or alternating current voltage of 100 V or more, and in particular provides a direct current voltage or alternating current voltage of 140 V or more for a cleaning procedure on the suction device.

13. The power supply arrangement according to claim 1, wherein the direct current source is a rechargeable battery unit.

14. A suction device, in particular a vacuum cleaner, including:
 a suction inlet;
 a dirt collection container;
 a filter device;
 a suction removal line; and
 a suction assembly;
 wherein the dirt collection device is in flow connection with the suction assembly by way of the filter device and the suction removal line, and negative pressure from the suction assembly acts on the filter device;
 and a power supply arrangement; said power supply arrangement including:
 a first connection to which a direct current source is connectible or connected;
 a second connection to which an alternating current source is connectible or connected;
 at least one third connection to which one or more consuming units of the suction device are connectible or connected;
 an electrically isolated converter which is connected on the input side in electrically active manner to the first connection; and
 a switchover device which is connected in electrically active manner to an output of the converter, is connected to the second connection and is connected to the at least one consuming unit;
 wherein by means of the switchover device it is selectable whether the at least one consuming unit is actively connected to the converter or the second connection for power supply; and
 wherein the switchover device has one or more components each with an electrical safety clearance, and the safety clearance of such a component is at least 4 mm in respect of the creepage distance and the total of the creepage distances of the components is at least 8 mm.

15. The suction device according to claim 14, including a cleaning device for the filter device.

16. The suction device according to claim 14, wherein a consuming unit of the suction device is at least one of an electric motor device of the suction assembly and a cleaning device for the filter device.

17. The suction device according to claim 14, wherein one or more power consuming units of the suction device are operable alternatively by direct current or alternating current.

* * * * *